US011326540B2

(12) United States Patent
Sekiguchi et al.

(10) Patent No.: US 11,326,540 B2
(45) Date of Patent: May 10, 2022

(54) ABNORMALITY DETERMINATION DEVICE OF INTERNAL COMBUSTION ENGINE

(71) Applicant: HONDA MOTOR CO., LTD., Tokyo (JP)

(72) Inventors: Toru Sekiguchi, Wako (JP); Takashi Konomoto, Wako (JP); Masahiro Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 16/744,393

(22) Filed: Jan. 16, 2020

(65) Prior Publication Data

US 2020/0256273 A1 Aug. 13, 2020

(30) Foreign Application Priority Data

Feb. 8, 2019 (JP) .............................. JP2019-021325

(51) Int. Cl.
 *F02D 41/22* (2006.01)
 *F02M 25/06* (2016.01)
 (Continued)

(52) U.S. Cl.
 CPC .............. *F02D 41/22* (2013.01); *F01M 11/10* (2013.01); *F01M 13/0011* (2013.01);
 (Continued)

(58) Field of Classification Search
 CPC ...... F02D 41/22; F02D 41/18; F02D 2200/04; F02M 35/10; F02M 35/10373;
 (Continued)

(56) References Cited

U.S. PATENT DOCUMENTS

2010/0147270 A1 6/2010 Pursifull et al.
2014/0076249 A1* 3/2014 Rollinger ............... F02M 35/09
 123/41.86
(Continued)

FOREIGN PATENT DOCUMENTS

CN 101614144 A 12/2009
CN 103670594 A 3/2014
(Continued)

OTHER PUBLICATIONS

Office Action dated Sep. 16, 2020, issued in counterpart JP Application No. 2019-021325, with English translation (4 pages).
(Continued)

*Primary Examiner* — Lindsay M Low
*Assistant Examiner* — Omar Morales
(74) *Attorney, Agent, or Firm* — Westman, Hattori, Daniels & Adrian, LLP

(57) ABSTRACT

An abnormality determination device of an internal combustion engine in which a breather line connects an intake-air path positioned upstream from a forced-induction system and a crankcase includes an intake-air flow rate sensor that detects an intake air flow rate in the intake-air path, a pressure sensor that detects a pressure of the breather line, and an abnormality determination unit that determines abnormality of the breather line. The abnormality determination unit estimates an intake air resistance of the intake-air path from the pressure when the engine is under low load conditions under which the intake air flow rate is less than a predetermined value and the pressure when the engine is under high load conditions under which the intake air flow rate is the predetermined value or greater and determines abnormality of the breather line when the intake air resistance is less than a threshold.

3 Claims, 4 Drawing Sheets

(51) Int. Cl.
  *F02M 35/10* (2006.01)
  *F01M 11/10* (2006.01)
  *F01M 13/00* (2006.01)
(52) U.S. Cl.
  CPC ...... *F02M 25/06* (2013.01); *F02M 35/10222* (2013.01); *F02M 35/10386* (2013.01); *F01M 2013/0038* (2013.01); *F01M 2013/0083* (2013.01); *F02D 2200/024* (2013.01); *F02D 2200/04* (2013.01)
(58) Field of Classification Search
  CPC ............. F02M 35/10386; F01M 11/10; F01M 13/0011; F01M 13/02; F01M 2013/0038; F01M 2013/0083
  USPC ........................................................ 123/572
  See application file for complete search history.

(56) References Cited

U.S. PATENT DOCUMENTS

| | | | |
|---|---|---|---|
| 2014/0081548 A1 | 3/2014 | Pursifull et al. | |
| 2014/0081550 A1* | 3/2014 | Jentz | F01M 1/18 701/101 |
| 2014/0081564 A1* | 3/2014 | Pursifull | G01M 15/08 701/113 |
| 2015/0059719 A1* | 3/2015 | Bidner | F01M 13/02 123/574 |
| 2016/0097355 A1* | 4/2016 | Jentz | F02D 41/22 701/102 |
| 2016/0195449 A1 | 7/2016 | Haslbeck et al. | |
| 2018/0371971 A1 | 12/2018 | Nakano et al. | |

FOREIGN PATENT DOCUMENTS

| | | |
|---|---|---|
| CN | 103670595 A | 3/2014 |
| CN | 105593480 A | 5/2016 |
| CN | 109026277 A | 12/2018 |
| JP | 10-184335 A | 7/1998 |
| JP | 10-184336 A | 7/1998 |
| JP | 2007-002838 A | 1/2007 |
| JP | 2013-117176 A | 6/2013 |
| JP | 2013-124587 A | 6/2013 |
| JP | 2017-115584 A | 6/2017 |
| JP | 2017-115849 A | 6/2017 |

OTHER PUBLICATIONS

Office Action dated Jul. 1, 2021, issued in counterpart CN application No. 202010020805.8, with English translation. (10 pages).

* cited by examiner

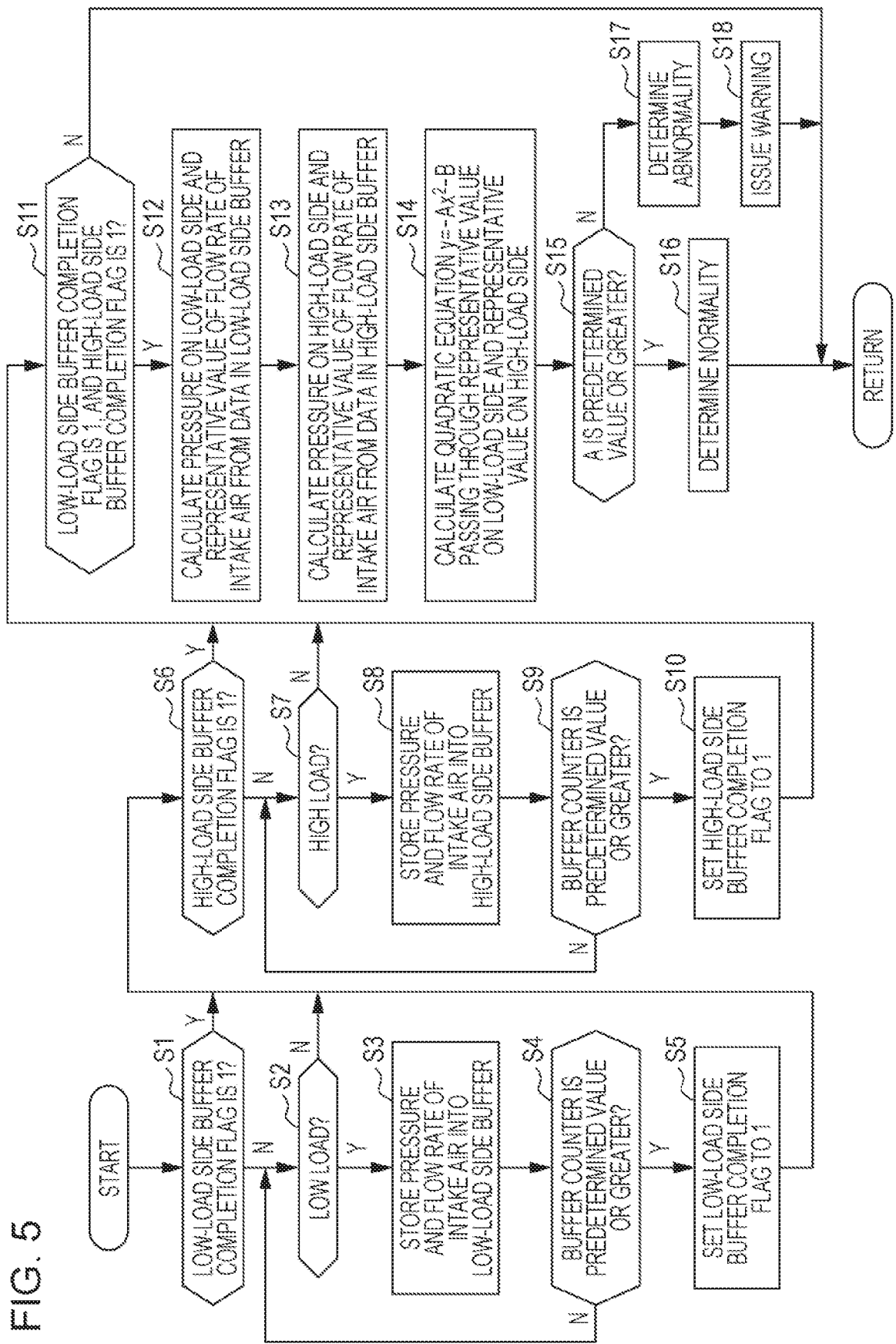

ABNORMALITY DETERMINATION DEVICE OF INTERNAL COMBUSTION ENGINE

CROSS REFERENCES TO RELATED APPLICATIONS

The present application claims priority under 35 U.S.C. § 119 to Japanese Patent Application No. 2019-021325, filed Feb. 8, 2019, entitled "Abnormality Determination Device of Internal Combustion Engine." The contents of this application are incorporated herein by reference in their entirety.

TECHNICAL FIELD

The present disclosure relates to an abnormality determination device of an internal combustion engine in which an intake-air path positioned upstream from a forced-induction system and a crankcase are connected to each other by a breather line.

BACKGROUND

A method that is employed by such an abnormality determination device of an internal combustion engine is known from U.S. Patent Application Publication No. 2016/0097355A1. In the method, in a state where an internal combustion engine is under high load conditions under which the flow rate of intake air in an intake-air path is equal to or greater than a predetermined flow rate, the integrated value of an estimated pressure in a breather line over a predetermined period of time when the breather line is in a normal state and the integrated value of the actual pressure in the breather line over a predetermined period of time that is detected by a pressure sensor are calculated, and when the ratio of the integrated value of the actual pressure to the integrated value of the estimated pressure is equal to or less than a threshold, it is determined that a connecting portion of the breather line is disconnected.

With the above-mentioned method of the related art, it takes time to perform abnormality determination because it is necessary to integrate, over a relatively long period of time, each of the actual pressure and the estimated pressure of the breather line, and in addition, there is a possibility that the accuracy of the abnormality determination will deteriorate when the correspondence relationship between the actual pressure and the estimated pressure varies due to offset of the output of the pressure sensor.

SUMMARY

The present application describes, for example, an abnormality determination device of an internal combustion engine that determines abnormality of a breather line of the internal combustion engine in a short time with high accuracy.

An embodiment of an abnormality determination device of an internal combustion engine according to the present disclosure in which an intake-air path positioned upstream from a forced-induction system and a crankcase are connected to each other by a breather line includes an intake-air flow rate sensor that detects the flow rate of intake air in the intake-air path, a pressure sensor that detects a pressure of the breather line, and an abnormality determination unit that determines abnormality of the breather line. The abnormality determination unit estimates an intake air resistance of the intake-air path from the pressure when the internal combustion engine is under low load conditions under which the flow rate of the intake air is less than a predetermined value and the pressure when the internal combustion engine is under high load conditions under which the flow rate of the intake air is equal to or greater than the predetermined value and determines abnormality of the breather line when the intake air resistance is less than a threshold. Therefore, abnormality of the breather line can be determined in a short time, and in addition, abnormality determination is less likely to be influenced by offset of the output of the pressure sensor, so that the determination accuracy is improved.

Note that an airflow meter 16 according to an embodiment of the present disclosure corresponds to the intake-air flow rate sensor according to the present disclosure.

BRIEF DESCRIPTION OF THE DRAWINGS

The advantages of the disclosure will become apparent in the following description taken in conjunction with the following drawings.

FIG. 5 is a flowchart illustrating an operation of the abnormality determination device for the breather line in one embodiment.

DETAILED DESCRIPTION

An embodiment of the present disclosure will be described below with reference to FIG. 1 to FIG. 5.

Figure 1:
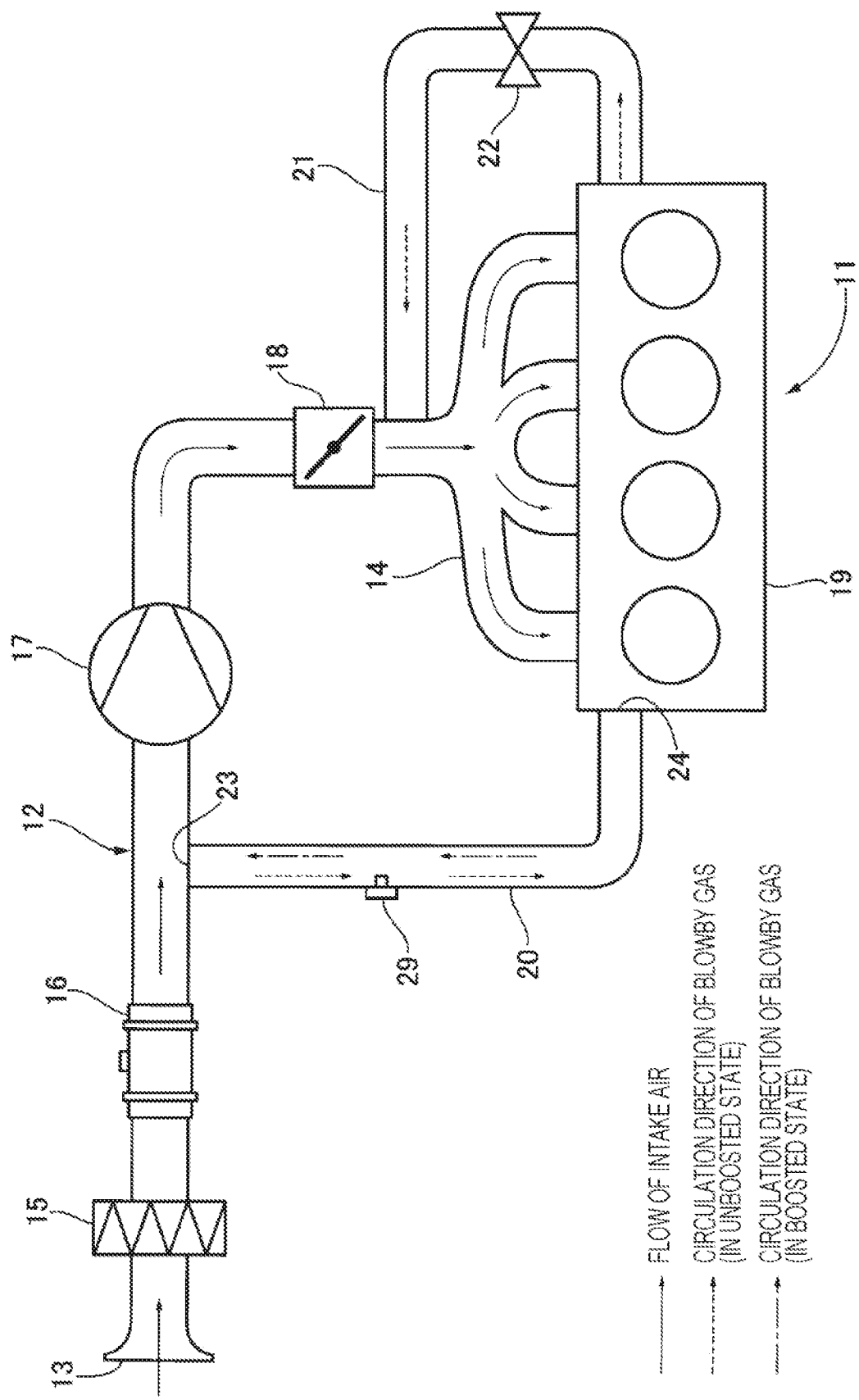
FIG. 1 is a diagram illustrating a configuration of an internal combustion engine that includes an abnormality determination device for a breather line in one embodiment.

As illustrated in FIG. 1, on an intake-air path 12 of an in-line four-cylinder four-cycle internal combustion engine 11 that is mounted on an automobile, an air cleaner 15 that removes dust contained in intake air, an airflow meter 16 that measures the flow rate of the intake air, a forced-induction system 17 that is formed of a turbocharger or a supercharger that pressurizes the intake air, and a throttle valve 18 that adjusts the flow rate of the intake air by reducing the diameter of the intake-air path 12 are arranged in this order in a direction from an intake port 13 toward an intake manifold 14, the intake port 13 being positioned at the upstream end in a flow direction of the intake air, and the intake manifold 14 being positioned at the downstream end in the flow direction of the intake air. A portion of the intake-air path 12 that is located between the airflow meter 16 and the forced-induction system 17 and a crankcase 19 of the internal combustion engine 11 are connected to each other by a breather line 20. In addition, the intake manifold 14 and the crankcase 19 of the internal combustion engine 11 are connected to each other by a positive crankcase ventilation (PCV) line 21, and a PCV valve 22 opens and closes an intermediate portion of the PCV line 21.

Blowby gas that is a portion of a fuel component contained in intake air, the portion having flowed in the crankcase 19 from a combustion chamber of the internal combustion engine 11 by passing through a gap between a piston and a cylinder, is caused to return to the intake-air path 12 through the breather line 20 or caused to return to the intake-air path 12 through the PCV line 21, so that the fuel component contained in the blowby gas is prevented from being released to an atmosphere.

In other words, when the PCV valve 22 is opened in a state where the internal combustion engine 11 is in an unboosted state in which the forced-induction system 17 does not operate, atmospheric pressure acts on a portion of the intake-air path 12 that is positioned upstream from the throttle valve 18, and in contrast, the intake negative pressure of the internal combustion engine 11 acts on a portion of the intake-air path 12 that is positioned downstream from the throttle valve 18. Thus, the intake air in the intake-air path 12 positioned upstream from the throttle valve 18 flows into the crankcase 19 through the breather line 20, and then, the intake air is returned to the intake manifold 14 through the PCV line 21 together with the blowby gas and is finally supplied to the combustion chamber of the internal combustion engine 11 together with the intake air.

When the internal combustion engine 11 is in a boosted state in which the forced-induction system 17 operates, although boost pressure acts on the portion of the intake-air path 12 positioned downstream from the forced-induction system 17, closing the PCV valve 22 prevents the boost pressure from escaping to the crankcase 19 through the PCV line 21. The blowby gas in the crankcase 19 is drawn into the intake-air path 12 by a negative pressure that is generated on the upstream side of the forced-induction system 17, which is operating. Then, the blowby gas passes through the intake-air path 12 together with the intake air and is supplied to the combustion chamber of the internal combustion engine 11.

When the internal combustion engine 11 is in the boosted state, for example, if a first connection portion 23 of the breather line 20 that is to be connected to the intake-air path 12 is disconnected from the intake-air path 12, or if a second connection portion 24 of the breather line 20 that is to be connected to the crankcase 19 is disconnected from the crankcase 19, there is a possibility that blowby gas flowing through the breather line 20 from the crankcase 19 toward the intake-air path 12 will be released to the atmosphere, and thus, it is necessary to detect abnormality of the breather line 20 and to issue a warning. Accordingly, the breather line 20 is provided with a pressure sensor 29 that detects the pressure in the breather line 20.

Figure 2:
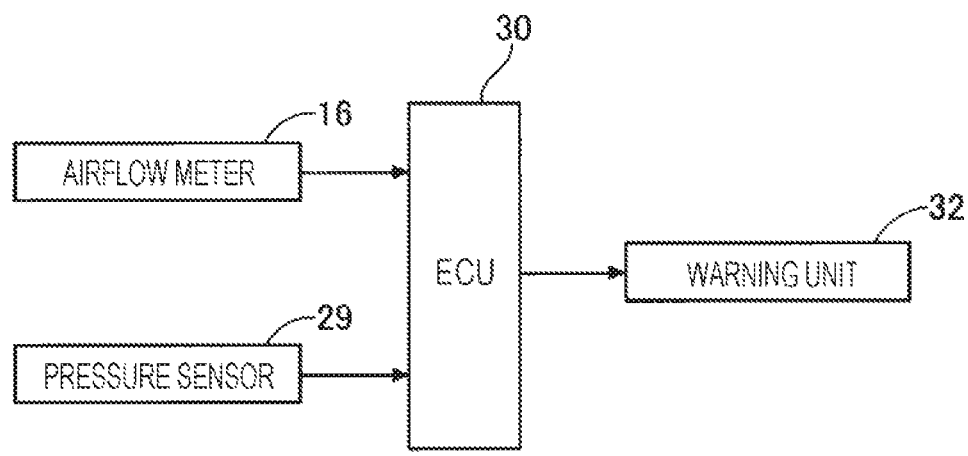
FIG. 2 is a block diagram of the abnormality determination device for the breather line in one embodiment.

As illustrated in FIG. 2, an abnormality determination unit 30 that is formed of an electronic control unit that determines abnormality of the breather line 20 is connected to the airflow meter 16, the pressure sensor 29, and a warning unit 32. The warning unit 32 is formed of, for example, a liquid crystal panel that is included in an instrument panel.

The advantageous effects of the embodiment of the present disclosure that includes the above-described configuration will now be described.

Figure 3:
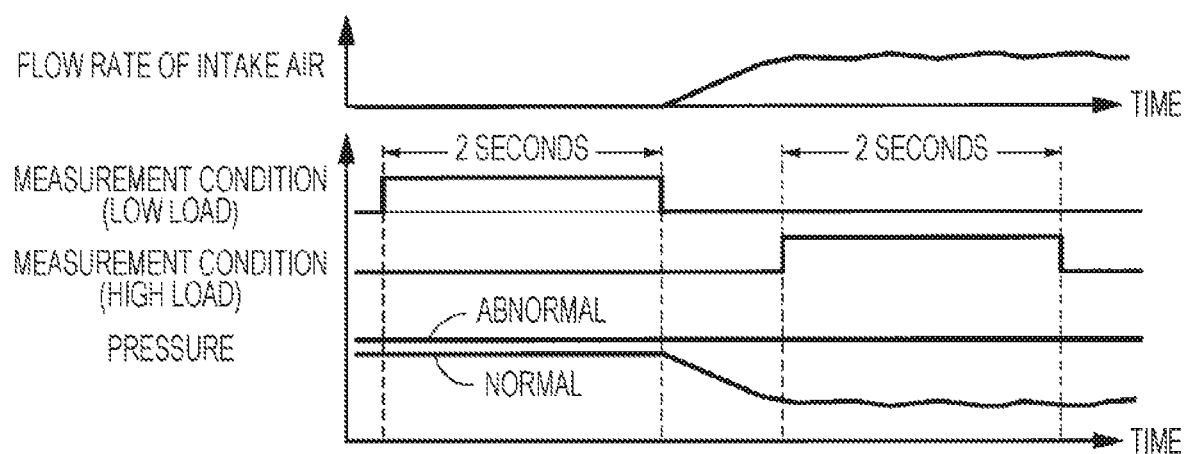
FIG. 3 is a time chart illustrating the principle of determination of abnormality of the breather line in one embodiment.

As illustrated in FIG. 3, when the internal combustion engine 11 is under low load conditions under which the flow rate of intake air in the intake-air path 12 that is detected by the airflow meter 16 is small, the pressure in the breather line 20 is measured by the pressure sensor 29 for a predetermined period of time (e.g., about two seconds). In addition, when the internal combustion engine 11 is under high load conditions under which the flow rate of the intake air in the intake-air path 12 that is detected by the airflow meter 16 is large, the pressure in the breather line 20 is measured by the pressure sensor 29 for a predetermined period of time (e.g., about two seconds).

The pressure in the breather line 20 decreases as the intake negative pressure in the intake-air path 12 increases as a result of an increase in the load on the internal combustion engine 11. However, in the case where the first connection portion 23 of the breather line 20 is disconnected from the intake-air path 12, or the second connection portion 24 of the breather line 20 is disconnected from the crankcase 19, and in the case where an intermediate portion of the breather line 20 breaks, the internal space of the breather line 20 is caused to communicate with the atmosphere, and thus, even if the intake negative pressure in the intake-air path 12 increases, the pressure in the breather line 20 is less likely to decrease. Therefore, abnormality of the breather line 20 can be determined on the basis of this phenomenon.

Figure 4:
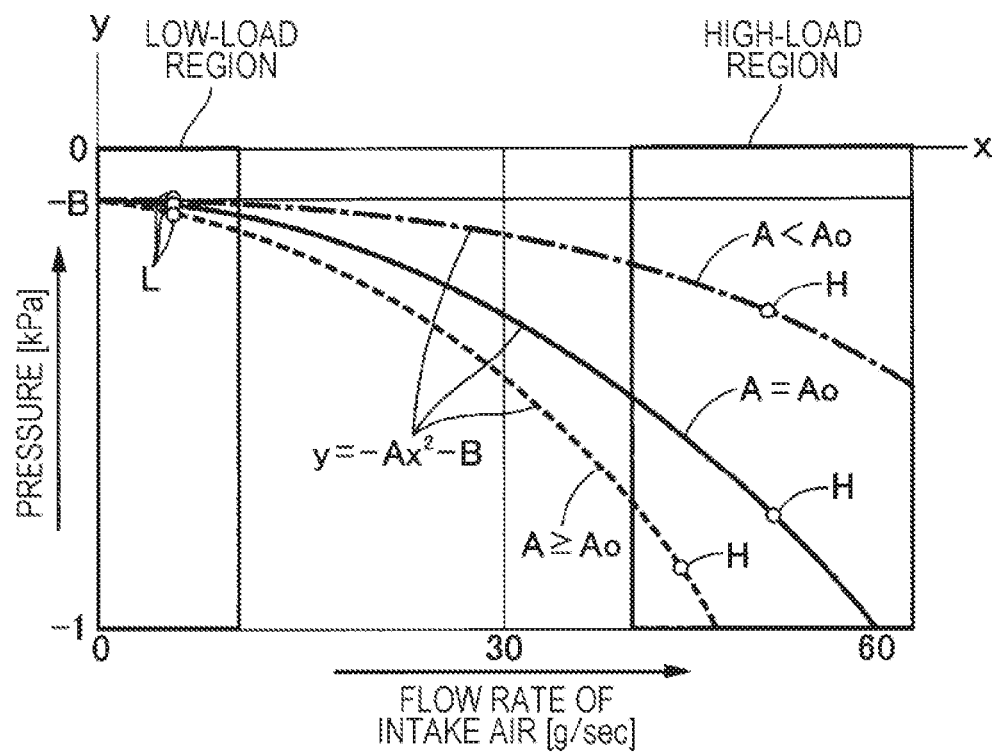
FIG. 4 is a graph illustrating a relationship between the flow rate of intake air in an intake-air path and the pressure in the breather line in one embodiment.

In the graph illustrated in FIG. 4, the horizontal axis (x-axis) denotes the flow rate of the intake air in the intake-air path 12 detected by the airflow meter 16, and the vertical axis (y-axis) denotes the pressure in the breather line 20 detected by the pressure sensor 29. A pressure y in the breather line 20 decreases as an intake air flow rate x in the intake-air path 12 increases, and its change characteristics are approximated by a quadratic curve $y=-Ax^2-B$ that is indicated by a solid line in FIG. 4.

The quadratic curve $y=-Ax^2-B$ can be calculated as a quadratic curve that passes through a low-load region of the internal combustion engine 11 in which the flow rate of the intake air in the intake-air path 12 detected by the airflow meter 16 is small, that is, an L point that corresponds to the pressure and the intake air flow rate detected when the internal combustion engine 11 is in idling operation or in a deceleration fuel cut-off mode, and a high-load region of the internal combustion engine 11 in which the flow rate of the intake air in the intake-air path 12 detected by the airflow meter 16 is large, that is, an H point that corresponds to the pressure and the intake air flow rate detected when the internal combustion engine 11 operates under a higher load than in the low-load region.

In a normal state in which the first connection portion 23 and the second connection portion 24 of the breather line 20 are not disconnected, and in which the intermediate portion of the breather line 20 is not broken, the pressure greatly decreases as the intake negative pressure increases, and thus, the quadratic curve $y=-Ax^2-B$ becomes like that indicated by a dashed line in FIG. 4. In this case, an intake-air-resistance coefficient A that represents the intake air resistance of the intake-air path 12 is equal to or greater than a threshold $A_0$. In contrast, in an abnormal state in which the first connection portion 23 or the second connection portion 24 of the breather line 20 is disconnected, or in which the intermediate portion of the breather line 20 is broken, the pressure does not greatly decrease even when the intake negative pressure increases, and thus, the quadratic curve $y=-Ax^2-B$ becomes like that indicated by a one-dot chain line in FIG. 4. In this case, the intake-air-resistance coefficient A that represents the intake air resistance of the intake-air path 12 is less than the threshold $A_0$. Consequently, by comparing the intake-air-resistance coefficient A that is calculated from the flow rate of the intake air in the intake-air path 12 and the pressure in the breather line 20 with the threshold $A_0$, abnormality of the breather line 20 can be determined.

Next, steps for determining abnormality of the breather line 20 that are performed by the abnormality determination unit 30 will be described with reference to the flowchart illustrated in FIG. 5.

First, when a low-load side buffer completion flag is 0 in step S1, and accumulation of data regarding the intake air flow rate and the pressure in a state where the internal combustion engine 11 is under low load conditions is not completed, if the intake air flow rate detected by the airflow meter 16 is less than a predetermined value, and the internal combustion engine 11 is under low load conditions in step S2, the intake air flow rate detected by the airflow meter 16 and the pressure detected by the pressure sensor 29 are stored in a low-load side buffer in step S3. Each time step S2 and step S3 are repeated, a buffer counter is incremented. When the count value of the buffer counter is equal to or greater than a predetermined value in step S4, it is determined in step S5 that the accumulation of data regarding the intake air flow rate and the pressure in a state where the internal combustion engine 11 is under low load conditions is completed, and the low-load side buffer completion flag is set to 1.

After the process of step S5 has been performed, or when the low-load side buffer completion flag is 1 in step S1, or when the internal combustion engine 11 is not under low load conditions in step S2, the process continues to step S6. When a high-load side buffer completion flag is 0 in step S6, and accumulation of data regarding the intake air flow rate and the pressure in a state where the internal combustion engine 11 is under high load conditions is not completed, if the intake air flow rate detected by the airflow meter 16 is equal to or greater than the predetermined value, and the internal combustion engine 11 is under high load conditions in step S7, the intake air flow rate detected by the airflow meter 16 and the pressure detected by the pressure sensor 29 are stored in a high-load side buffer in step S8. Each time step S7 and step S8 are repeated, a buffer counter is incremented. When the count value of the buffer counter is equal to or greater than a predetermined value in step S9, it is determined in step S10 that the accumulation of data regarding the intake air flow rate and the pressure in a state where the internal combustion engine 11 is under high load conditions is completed, and the high-load side buffer completion flag is set to 1.

After the process of step S10 has been performed, or when the high-load side buffer completion flag is 1 in step S6, or when the internal combustion engine 11 is not under high load conditions in step S7, the process continues to step S11. If the low-load side buffer completion flag is 1, and the high-load side buffer completion flag is 1 in step S11, it is determined that the accumulation of data regarding the intake air flow rate and the pressure in a state where the internal combustion engine 11 is under low load conditions and the accumulation of data regarding the intake air flow rate and the pressure in a state where the internal combustion engine 11 is under high load conditions are both completed, and the representative value of the intake air flow rate and the pressure (point L in FIG. 4) is calculated as the average value of the plurality of data items accumulated in the low-load side buffer in step S12. In addition, the representative value of the intake air flow rate and the pressure (point H in FIG. 4) is calculated as the average value of the plurality of data items accumulated in the high-load side buffer in step S13.

Subsequently, in step S14, the quadratic curve $y=-Ax^2-B$ that passes through the representative value on the low-load side (point L in FIG. 4) and the representative value on the high-load side (point H in FIG. 4) is determined. As a result, if the quadratic curve $y=-Ax^2-B$ is in the state indicated by the dashed line, and the intake-air-resistance coefficient A representing the intake air resistance of the intake-air path 12 is equal to or greater than the threshold $A_0$ in step S15, it is determined in step S16 that the breather line 20 is in the normal state. In contrast, if the quadratic curve $y=-Ax^2-B$ is in the state indicated by the one-dot chain line, and the intake-air-resistance coefficient A representing the intake air resistance of the intake-air path 12 is less than the threshold $A_0$ in step S15, it is determined in step S17 that the breather line 20 is in an abnormal state, and the warning unit 32 is activated so as to issue a warning to an occupant in step S18.

As described above, according to the present embodiment, both when the internal combustion engine 11 is under low load conditions and when the internal combustion engine 11 is under high load conditions, the flow rate of the intake air in the intake-air path 12 and the pressure in the breather line 20 are each measured for a predetermined period of time, and the intake air resistance of the intake-air path 12 is estimated from the pressure when the internal combustion engine 11 is under low load conditions, under which the flow rate of the intake air is less than the predetermined value, and the pressure when the internal combustion engine 11 is under high load conditions, under which the flow rate of the intake air is equal to or greater than the predetermined value. When the intake air resistance is small, it is determined that leakage has occurred in the breather line 20, and thus, determination of abnormality of the breather line 20 can be completed in a short time of about 2 seconds.

In addition, since the intake air resistance of the intake-air path 12 is estimated from the pressure in the breather line 20 when the internal combustion engine 11 is under low load conditions and the pressure in the breather line 20 when the internal combustion engine 11 is under high load conditions, both the pressure values being detected by the single pressure sensor 29, abnormality determination is less likely to be influenced by offset of the output of the pressure sensor 29. In other words, even if the output of the pressure sensor 29 is offset, only the value of B of the quadratic curve $y=-Ax^2-B$ in the graph illustrated in FIG. 4 changes, and the value of the intake-air-resistance coefficient A does not change. Therefore, the accuracy of abnormality determination can be improved by accurately estimating the intake air resistance of the intake-air path 12.

Although the embodiment of the present disclosure has been described above, various design changes can be made within the gist of the present disclosure.

For example, the number of cylinders of the internal combustion engine 11 is not limited to four, which is mentioned in the embodiment.

In addition, in the embodiment, although the breather line 20 is connected to the crankcase 19, the advantageous effects of the present disclosure can also be obtained by causing the internal space of the crankcase 19 and the internal space of a head cover to communicate with each other and by connecting the breather line 20 to the head cover. Therefore, such a configuration in which the breather line 20 is connected to another space that is in communication with the crankcase 19 is also included in the technical scope of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An abnormality determination device of an internal combustion engine in which a crankcase and an intake-air path positioned upstream from a forced-induction system are connected to each other by a breather line, the abnormality determination device comprising:
- an intake-air flow rate sensor that detects a flow rate of intake air in the intake-air path;
- a pressure sensor that detects a pressure of the breather line; and
- an abnormality determination unit that determines abnormality of the breather line,
- wherein the abnormality determination unit:
- obtains a first pressure of the breather line when the internal combustion engine is under low load conditions under which the flow rate of the intake air is less than a predetermined value,
- obtains a second pressure of the breather line when the internal combustion engine is under high load conditions under which the flow rate of the intake air is equal to or greater than the predetermined value,
- calculates a quadratic curve which passes through the first pressure and the second pressure, the quadratic curve being defined as a formula:

$$y=-Ax^{2-B},$$

- obtains an intake air resistance of the intake-air path, the intake air resistance being the coefficient A in the formula,
- determines whether the intake air resistance is equal to or higher than a threshold, and
- determines occurrence of abnormality of the breather line when the intake air resistance is less than the threshold.

2. The abnormality determination device according to claim 1, wherein the abnormality determination unit determines no occurrence of abnormality of the breather line when the intake air resistance is equal to or higher than the threshold.

3. An abnormality determination method of an internal combustion engine in which a crankcase and an intake-air path positioned upstream from a forced-induction system are connected to each other by a breather line, the method comprising steps of:
- detecting by an intake-air flow rate sensor a flow rate of intake air in the intake-air path;
- detecting by a pressure sensor a pressure of the breather line;
- obtaining by a computer a first pressure of the breather line when the internal combustion engine is under low load conditions under which the flow rate of the intake air is less than a predetermined value;
- obtaining by the computer a second pressure of the breather line when the internal combustion engine is under high load conditions under which the flow rate of the intake air is equal to or greater than the predetermined value;
- calculating by the computer a quadratic curve which passes through the first pressure and the second pressure, the quadratic curve being defined as a formula:

$$y=-Ax^{2-B};$$

- obtaining by the computer an intake air resistance of the intake-air path, the intake air resistance being the coefficient A in the formula;
- determining by the computer whether the intake air resistance is equal to or higher than a threshold; and
- determining by the computer occurrence of abnormality of the breather line when the intake air resistance is less than the threshold.

* * * * *